(12) United States Patent
Tessarolo et al.

(10) Patent No.: US 6,341,344 B1
(45) Date of Patent: Jan. 22, 2002

(54) APPARATUS AND METHOD FOR MANIPULATING DATA FOR ALIGNING THE STACK MEMORY

(75) Inventors: Alexander Tessarolo, Sydney (AU); Mahesh Mehendale, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/271,386

(22) Filed: Mar. 18, 1999

Related U.S. Application Data
(60) Provisional application No. 60/078,699, filed on Mar. 20, 1998.

(51) Int. Cl.[7] ............................. G06F 9/06; G06F 9/32; G06F 12/12; G06F 12/04; G06F 12/02
(52) U.S. Cl. ...................... 712/202; 712/201; 712/217; 712/211; 711/132; 711/134; 711/201; 711/217
(58) Field of Search ................................. 712/201, 202, 712/248, 211, 244, 245, 230, 217, 218, 219, 227, 228; 711/132, 133, 134, 201, 211, 220, 217, 212; 714/15

(56) References Cited

U.S. PATENT DOCUMENTS

| | | | | |
|---|---|---|---|---|
| 3,889,243 A | * | 6/1975 | Drimak | 364/243 |
| 4,419,726 A | * | 12/1983 | Weidner | 364/243 |
| 5,335,332 A | * | 8/1994 | Christopher, Jr. et al. | 364/400 |
| 5,396,624 A | * | 3/1995 | Campbell, Jr. | 705/44 |
| 5,687,336 A | * | 11/1997 | Shen et al. | 395/378 |
| 5,761,491 A | * | 6/1998 | Circello et al. | 712/244 |
| 6,070,010 A | * | 5/2000 | Keenleyside et al. | 395/705 |
| 6,085,307 A | * | 7/2000 | Evoy et al. | 712/31 |

OTHER PUBLICATIONS

Langdon, Jr., "Computer Design" 1982, pp. 103–106 and 115–118.*

* cited by examiner

*Primary Examiner*—Daniel H. Pan
(74) *Attorney, Agent, or Firm*—W. Daniel Swayze, Jr.; W. James Brady; Frederick J. Telecky, Jr.

(57) ABSTRACT

A method and apparatus for manipulating data from a processor on a stack memory is disclosed. The method and apparatus comprises aligning a stack pointer (104) in the stack memory (110) to a first memory address (126). The method further comprises incrementing the stack pointer (104) to a second memory address (128). The method further comprises saving data from a register (102) into the stack memory (110) at the second memory address (128). The method further comprises aligning the stack pointer (104) to a next even address if at an odd address when the saving step is complete. The method further comprises performing processor operations. The method further comprises unaligning the stack pointer (104) from the even address back to the odd address. The method further comprises restoring data from the stack memory (110) into the register (102). The method further comprises decrementing the stack pointer (104) from the second memory address (128) to the first memory address (126).

14 Claims, 2 Drawing Sheets

APPARATUS AND METHOD FOR MANIPULATING DATA FOR ALIGNING THE STACK MEMORY

This application claims benefit of Provisional Appln. 60/078,699 filed Mar. 20, 1998.

TECHNICAL FIELD OF THE INVENTION

The present invention relates in general to central processing units, and more particularly, to an apparatus and method for manipulating data from processors on a stack memory.

BACKGROUND OF THE INVENTION

Reading and writing data with the use of registers on a processor is known in the art and used in nearly all computer architecture applications. Processors read and write to data memory in the course of performing operations. Read and write operations also may occur to and from a memory block attached to the central processing unit ("CPU") of a computer that is reserved for stack operations. This memory may be called the stack memory. The stack memory is used for passing parameters or as a temporary storage for data. The stack memory is also used for saving and restoring data from registers during interrupts. During an interrupt, registers automatically save and restore using read and write operations on the stack memory. Processors generally have an address register called a stack pointer that indicates the address of the top data word on the stack memory. The stack memory increases from low to high and the stack pointer generally points to the next empty location. Alternatively, the stack memory may increase from high to low.

Read and write operations may be performed on the stack memory by incrementing or decrementing the stack pointer. The stack pointer is a register that contains a value equal to the address of the empty location that currently is on top of the stack memory. A read operation is performed on the stack memory by decrementing the contents of the stack pointer and reading the memory data at the address indicated by the updated stack pointer. This operation is referred to as a stack POP operation. Write operations are performed by writing the memory data at the address indicated by the stack pointer and incrementing the contents of the stack pointer. This operation is referred to as a stack PUSH operation. Data may be read out of the stack memory but is not physically removed. A new data word may be written in the memory address that has been read out.

All 32-bit data access operations to a 16-bit stack memory are even address aligned. If the stack pointer is aligned with an odd address location before an operation, a value written starts from the next lowest even address. In general, computer devices ensure the stack pointer is always aligned before an interrupt occurs, especially when the stack pointer points to 16-bit memory locations and 32-bit register save/restore operations are executed. Thus, a stack pointer pointing to an odd address during a write operation on the stack memory decrements itself to the even address below the odd address. During the write operation, the incoming data overwrites data at the odd address initially indicated by the stack pointer, causing an error. Data in the odd address will be corrupted by the overwrite.

Data saved on the stack may consist of a mixture of 16 and 32-bit data words. When mixing data words, if the number of 16-bit values is not an even multiple between the 32-bit values, then memory holes are created as the stack pointer aligns with an even address prior to any operations on the stack memory.

High level language compilers may require that the alignment of the stack memory always be known. During an interrupt, the state of the stack memory may be unknown. Knowing the state of the stack memory enables the previous state to be restored when the interrupt is complete.

SUMMARY OF THE INVENTION

From the foregoing, it may be appreciated that a need has arisen for a method performing operations on a stack memory without corrupting data during alignments. In accordance with the present invention, an apparatus and method for manipulating data from a processor on a stack memory is provided that substantially eliminates or reduces disadvantages and problems associated with conventional stack memory operations.

An apparatus for manipulating data from a processor on a stack memory is disclosed. The apparatus has a stack pointer on the stack memory and a first memory address aligned with the stack pointer. The apparatus further has a second memory address. The second memory address is determined by incrementing the stack pointer from the first memory address when data is saved into the stack memory. The stack pointer decrements from the second memory address back to the first memory address when data is restored from the stack memory. The apparatus further has at least one register having data saved into the stack memory at the second memory address and restored back to the at least one register. The apparatus further has an alignment device aligning the stack pointer when the pointer indicates an odd address after data has been saved to the stack memory, and unaligning the stack pointer prior to restoring data from the stack memory. The alignment device further aligns the stack pointer to a next even address when the stack pointer indicates an odd address. The apparatus further has a stack pointer align bit that is equal to one when the alignment device aligns the stack pointer.

In another embodiment, a method for manipulating data from a processor on a stack memory for use in accordance with the present invention comprises eight steps. The first step comprises aligning a stack pointer in the stack memory to a first memory address. The second step comprises incrementing the stack pointer to a second memory address to create an empty memory address in the stack memory. The third step comprises saving data from at least one register into the stack memory at the second memory address, indicated by the stack pointer. The fourth step comprises aligning the stack pointer to a next even address and setting a stack pointer align bit on the register equal to one when the stack pointer indicates an odd address after the saving step is complete. The fifth step comprises performing processor operations. The sixth step comprises unaligning the stack pointer from the next even address to the odd address when the second aligning step is executed and the stack pointer align bit is equal to one. The seventh step comprises restoring data from the stack memory into the register after completion of the processor operations. The eighth step comprises decrementing the stack pointer from the second memory address to the first memory address and removing the empty memory address.

A technical advantage of the present invention is that a method of manipulating data from a processor on a stack memory is provided. Another technical advantage of the present invention is that address registers will not be corrupted by overwriting during alignment operations. Another technical advantage of the present invention is that stack memory usage and memory costs are reduced. Another technical advantage of the present invention is that memory holes are decreased in the stack memory, thereby increasing the availability of the stack memory.

BRIEF DESCRIPTION OF THE DRAWINGS

For a more complete understanding of the present invention and its advantages thereof, reference is now made to the following description taken in conjunction with the accompanying drawings, wherein like reference numerals represent like parts, in which.

DETAILED DESCRIPTION OF THE INVENTION

Figure 1:
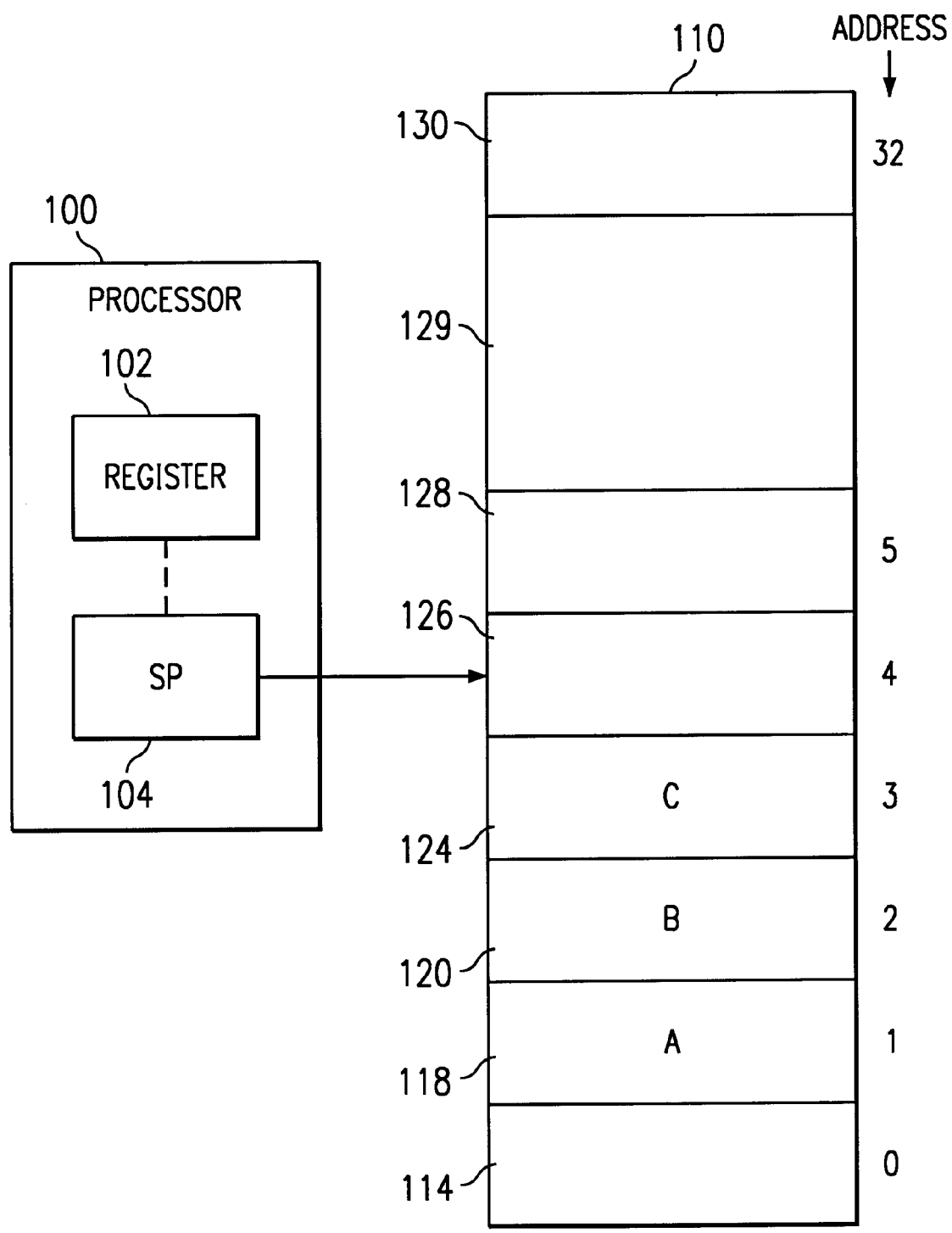
FIG. 1 illustrates a block diagram of a stack memory for use in a CPU in accordance with one embodiment of the present invention.
Figure 2:
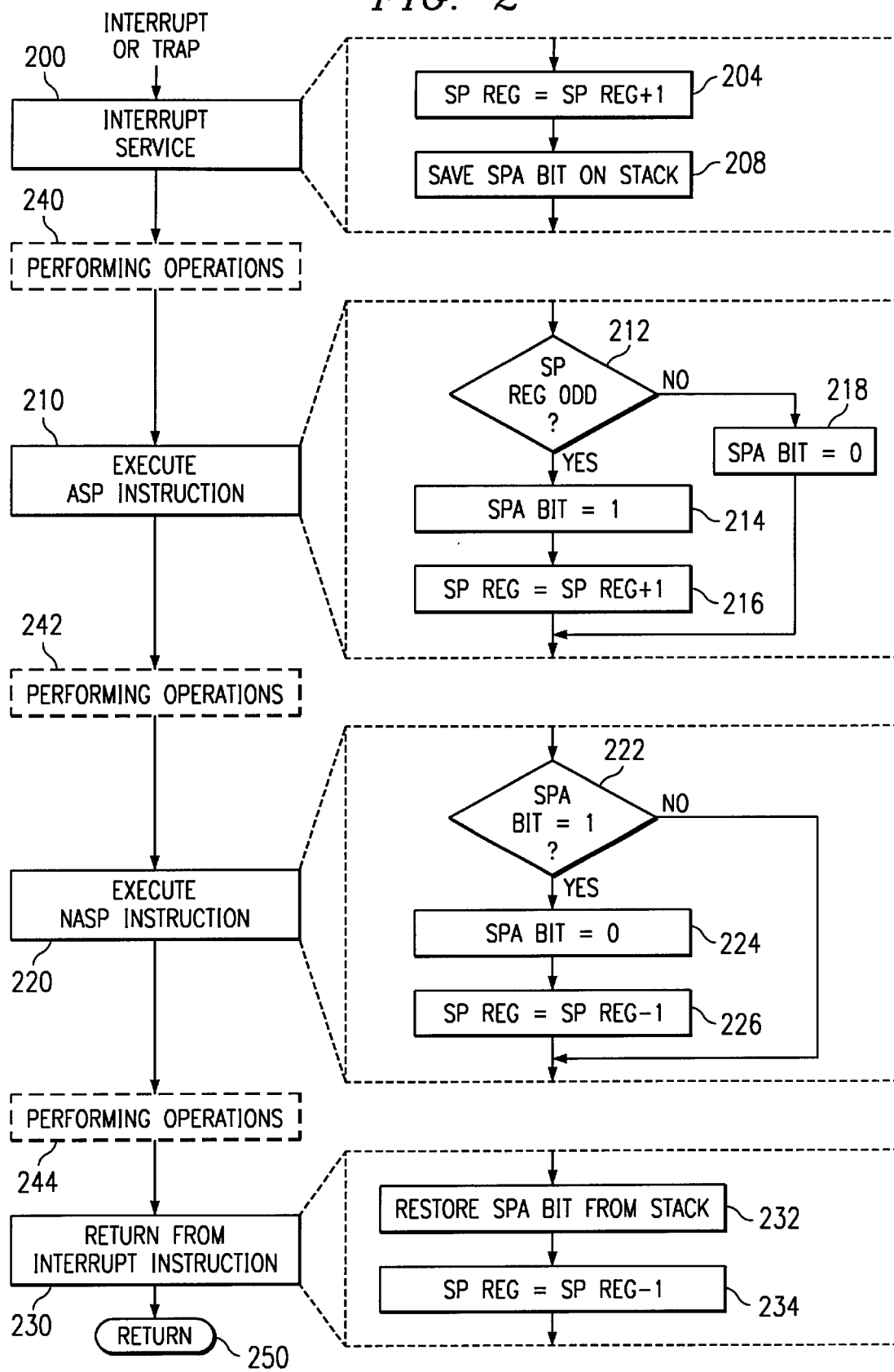
FIG. 2 illustrates a flowchart of a method for saving and restoring data in accordance with one embodiment of the present invention.

An embodiment of the present invention and its advantages are best understood by referring now in more detail to FIGS. 1 and 2 of the drawings, in which like numerals refer to like parts. FIGS. 1 and 2 illustrate an apparatus and method for manipulating data from a processor on a stack memory in accordance with one embodiment of the present invention.

FIG. 1 illustrates a processor 100. Processor 100 may be a 16-bit addressable machine that can perform 32-bit reads and writes to data memory. In FIG. 1, status register 102 is on processor 100. Other registers (not shown) also may be on processor 100. The data contents of status register 102 may be saved to stack memory 110. Stack memory 110 may be on or off processor 100. Stack memory 110 may be used for passing parameters or as temporary storage of data from registers on processor 100. In an embodiment, the data contents are saved to stack memory 110 during an interrupt on processor 100. The data is kept in stack memory 110 until the interrupt is complete and the data contents may be read out of stack memory 110 back into status register 102.

During interrupts, registers, such as status register 102, may be automatically saved and restored using 32-bit read and write operations on stack memory 110. Stack memory 110 increases from low to high memory, as indicated in FIG. 1. Stack memory 110 is a storage device, which stores information in such a manner that the item stored last is the first item retrieved.

Processor 100 also includes a stack pointer 104. Stack pointer 104 is an address register that contains a binary number whose value is equal to the address at the top data word in stack memory 110. Registers 114, 118, 120, 124, 126, 128, 129, and 130 depict physical registers, or memory locations, of stack memory 110. These physical registers, or memory locations, may be used for reading and writing data words onto stack memory 110. In an embodiment, contents of 32-bit words may be inserted or overwritten in the physical registers of stack memory 110. Stack pointer 104 holds the address of the last item inserted into stack memory 110.

In FIG. 1, registers 114, 118, 120, and 124 are full. Registers 126 and 128 are empty. Registers 129 represent the physical registers between register 128 and register 130. Further, FIG. 1 depicts the addresses of the physical registers. Register 124, with an address of 3, is the highest memory location that is full in stack memory 110. Register 126, with an address of 4, is the next empty location. Data from status register 102 may be written onto stack memory 110 at Register 126. Stack pointer 104 is aligned with this next empty memory location. As operations are performed on stack memory 110, stack pointer 104 will increment and decrement to align itself with the next empty location in stack memory 110. These locations are indicated by the addresses of the registers in stack memory 100 with the address of the next empty memory location in stack pointer 104.

An alignment device may be comprised of stack pointer 104 and logic in processor 100. Stack pointer 104 would align itself with a register address after receiving commands to increment or decrement on the stack memory 110. Instructions may be stored in memory. Instructions may be retrieved from memory in the CPU and read into processor 100 in order to align stack pointer 104 with stack memory 110. In an embodiment, these instructions may be implemented as logic on processor 100. For example, during an interrupt in an embodiment, processor 100 may read alignment instructions from memory and align stack pointer 104 accordingly. Data from registers, such as status register 102, on processor 100 may then be manipulated by either reading or writing onto stack memory 110.

In an embodiment, status register 102 may be saved and restored during interrupts on processor 100. Status register 102 may indicate the state of other registers and components on processor 100 when an interrupt occurs. The state of stack memory 110 may also be indicated in status register 102. A stack point align bit may be contained in status register 102, which is saved and restored in status register 102 is saved during an interrupt on processor 100. Stack pointer align bit may be 1 or 0 and may indicate whether operations have been performed on stack memory 110 prior to interrupt. When status register 102 is restored after an interrupt, the stack pointer align bit may indicate whether further alignment operations are desired on stack memory 110. For example, stack pointer 104 may be incremented or decremented, depending on the value stored in the stack pointer align bit.

Referring to FIG. 2, a method for manipulating data from processor 100 on stack memory 110 in accordance with the present invention is disclosed. In an embodiment, an interrupt on processor 100 occurs that requires data to be stored on stack memory 110 while the interrupt is in progress. Further, alignment routines may not be executed until an interrupt occurs in an embodiment. Thus, stack pointer 104 may not have to align itself for every operation on stack memory 110. In step 200, an interrupt signal is received that indicates an interrupt of the current operations is to be executed. In step 204, receipt of the interrupt signal in step 200 automatically increments stack pointer 104, that has been aligned with a first memory address in stack memory 110. The first memory address may be the next empty location. Stack pointer 104 then is incremented to a second memory address above the first memory address. This incrementation creates an empty memory address in stack memory 110. In an embodiment, the stack pointer is incremented by 1. Referring back to FIG. 1, stack pointer 104 is aligned with register 126 at address 4 when an interrupt occurs. Stack pointer 104 then is incremented to register 128 at address 5, thereby creating an empty memory address in register 126.

In step 208, data is saved from registers on processor 100 into stack memory 110 at the second memory address indicated by stack pointer 104. The status register 102, which includes the stack pointer align bit, may also be saved on stack memory 110. Referring back to FIG. 1, data words may be stored starting at register 128 at address 5. In an embodiment, 32-bit words may be written into stack memory 110. If 32-bit operations are not performed, then alignment issues may be ignored altogether. Further, in step 208, the stack pointer align bit saved onto stack 110 indicates whether the alignment device has been previously used by processor 100. In step 240, the saving operations are performed by writing bits from registers on processor 100 into stack memory 110.

In step 210, the alignment device receives an align stack pointer ("ASP") instruction and executes a stack pointer instruction that conditionally aligns stack pointer 104. In step 212, stack pointer 104 is queried whether an odd memory address is in the register of stack pointer 104. Referring back to FIG. 1, stack pointer 104 may have register 128's address of 5 stored to indicate the top of the stack in stack memory 110. If stack pointer 104 indicates it is aligned with an odd memory address, then step 214 is executed by setting the stack pointer align bit equal to 1. In step 216, stack pointer 104 has its register incremented and is moved to a new memory address. In an embodiment, the stack pointer 104 is incremented by 1 to the next highest even address. Thus, operations may be performed in stack memory 110, which may require even address alignment for 32-bit operations. Further, registers below an odd address indicated by stack pointer 104 will not be overwritten when an alignment is made. Referring back to step 212, if stack pointer 104 does not indicate an odd memory address, then step 218 is executed. In step 218, no alignments are necessary because stack pointer 104 is already aligned with an even address location. The stack pointer align bit is set equal to 0, which indicates alignment adjustments are not necessary in executing step 210.

In step 242, operations may be performed on processor 100 and on stack memory 100. These operations may include reading and writing on stack memory 110 where stack pointer 104 is aligned with empty registers. In an embodiment, stack pointer 104 may be aligning with an even address while performing these operations. By aligning with an even address, stack pointer 104 may be consistent by being in a known alignment to indicate the top of the stack in stack memory 110.

In step 220, the alignment device unaligns stack pointer 104 back to the memory address indicated prior to step 210 or a non-align stack pointer ("NASP") instruction. This memory address may be the second memory address indicated in step 204. Step 220 returns stack pointer 104 to an odd address if stack pointer 104 was incremented in step 216. In step 222, the stack pointer align bit's value is analyzed to determine whether stack pointer 104 requires any realignment. If the stack pointer align bit is equal to 1, this indicates stack pointer 104 was aligned to an even address from an odd address in step 216. In step 224, the stack pointer align bit is reset to 0. In step 226, stack pointer 104 is unaligned by decrementing the address in its register to return to the odd address aligned with stack pointer 104 prior to step 210. In an embodiment, stack pointer 104 is decremented by one address. Referring back to step 222, if the stack pointer align bit is not equal to 0, then no unalignment instructions are necessary. In step 244, further operations may be performed with stack pointer 104 and stack memory 110 in the positions indicated prior to step 210.

In step 230, a "return from interrupt instruction" ("IRET") is received. In an embodiment, an IRET indicates the interrupt is completed, and that operations running prior to the interrupt be restored. Data in stack memory 110 may be restored to the corresponding registers, and return the processor to its initial state. Stack pointer 104 may be automatically decremented after restoring all of the data in the stack registers from stack memory 110. In step 232, the stack pointer align bit, saved in step 208, is restored back to the status register 102. By executing step 232, the original state of stack memory 110 may be restored, and any further alignments or unalignments may be performed later. In step 234, stack pointer 104 is decremented from the second memory location to the first memory location. This first memory location is the same memory location in step 204, which was originally aligned with stack pointer 104. Further, the empty memory location created in step 204 is eliminated. In step 250, if the interrupt routine is complete, then processor 200 returns to its previous state.

Thus, it is apparent that there has been provided in accordance with the present invention an apparatus and method for manipulating data on a stack memory from a processor that satisfies the advantages set forth above. Although the present invention has been described in detail, it should be understood that various changes, substitutions, and alterations can be made herein. For example, although the data manipulations were described as occurring during an interrupt, the manipulations may be performed at any instance data is saved or restored from a stack memory. Other examples are readily ascertainable by one skilled in the art and can be made without departing from the spirit and scope of the present invention as defined by the following claims.

What is claimed is:

1. A method for manipulating data from a processor on a stack memory, the method comprising:

aligning a stack pointer in said stack memory to a first memory address in said stack memory;

incrementing said stack pointer to a second memory address to create an empty memory address in said stack memory;

saving data from at least one register into said stack memory at said second memory address indicated by said stack pointer;

performing processor operations;

restoring data from said stack memory into said at least one register after completion of said processor operations;

decrementing said stack pointer from said second memory location to said first memory location wherein said empty memory address in said stack memory is removed;

aligning said stack pointer to a new memory address when said stack pointer indicates only an odd address after said saving step is complete; and unaligning said stack pointer from said new memory address to said odd address.

2. The method of claim 1, wherein said performing step includes performing processor operations on said stack memory.

3. The method of claim 1, wherein said new memory address is a next even address above said odd address.

4. The method of claim 1, wherein said aligning step includes setting a stack pointer align bit, wherein said stack pointer bit is equal to one when said stack pointer indicates said odd address.

5. The method of claim 4, wherein said unaligning step is executed when said stack pointer align bit is equal to one.

6. The method of claim 4, wherein said stack pointer align bit is saved with said data on at least one register in said saving step.

7. The method of claim 1, wherein said incrementing step is executed in response to an interrupt signal from said processor.

8. The method of claim 1, wherein said performing step further comprises aligning said stack pointer to an even address during said operations.

9. A method for manipulating data from a processor on a stack memory, the method comprising the steps of:

aligning a stack pointer in said stack memory to a first memory address in said stack memory;

incrementing said stack pointer to a second memory address to create an empty memory address in said stack memory;

saving data from at least one register into said stack memory at said second memory address, indicated by said stack pointer;

aligning said stack pointer to a next even address and setting a stack pointer align bit on said at least one register equal to one when said stack pointer indicates only an odd address after said saving step is complete;

performing processor operations;

unaligning said stack pointer from said next even address to said odd address when said second aligning step is executed and said stack pointer align bit is equal to one;

restoring data from said stack memory into said at least one register after completion of said processor operations; and decrementing said stack pointer from said second memory address to said first memory address and removing said empty memory address in said stack memory.

10. The method of claim 9, wherein said stack pointer align bit is saved in said saving step.

11. The method of claim 9, wherein said data is 32-bit words.

12. The method of claim 9, wherein said first aligning step aligns said stack pointer to a next empty location in said stack memory.

13. The method of claim 9, said saving step comprising:

writing said data in said at least one register into said stack memory.

14. The method of claim 9, said restoring step comprising:

reading said data from stack memory into said at least one register.

* * * * *